United States Patent [19]
McIver et al.

[11] Patent Number: 5,828,138
[45] Date of Patent: Oct. 27, 1998

[54] ACCELERATION SWITCH

[75] Inventors: George William McIver, Redondo Beach; Michael Dean Lammert, Manhattan Beach, both of Calif.

[73] Assignee: TRW Inc., Lyndhurst, Ohio

[21] Appl. No.: 756,948

[22] Filed: Dec. 2, 1996

[51] Int. Cl.$^6$ .......................... H01H 35/14; G01P 15/00
[52] U.S. Cl. ................................. 307/10.1; 200/61.45 R; 200/61.45 M; 180/282; 701/45; 73/514.16; 73/514.36; 307/121
[58] Field of Search ...................... 200/61.45 R, 61.49 R, 200/61.51, 61.45 M; 307/9.1, 10.1, 116, 119, 120, 121, 122, 123, 124; 180/268, 271, 281, 282, 286; 280/735, 806; 701/1, 29, 31, 34, 36, 45; 73/1.37, 1.38, 1.39, 488, 514.01, 514.36, 514.16

[56] References Cited

U.S. PATENT DOCUMENTS

| | | |
|---|---|---|
| 4,543,457 | 9/1985 | Petersen et al. . |
| 4,673,777 | 6/1987 | Bai et al. . |
| 4,803,342 | 2/1989 | Steers et al. . |
| 4,855,544 | 8/1989 | Glenn . |
| 5,010,216 | 4/1991 | Sewell et al. . |
| 5,123,499 | 6/1992 | Breed et al. . |
| 5,165,717 | 11/1992 | Tanaka . |
| 5,177,331 | 1/1993 | Rich et al. . |
| 5,261,506 | 11/1993 | Jost . |
| 5,335,749 | 8/1994 | Taguchi et al. . |
| 5,378,865 | 1/1995 | Reneau . |
| 5,387,819 | 2/1995 | Ueno et al. . |
| 5,608,270 | 3/1997 | Meister ................................ 307/10.1 |
| 5,665,914 | 9/1997 | Yamamoto ........................ 73/514.16 |
| 5,686,711 | 11/1997 | Yamamoto ........................ 73/514.16 |

FOREIGN PATENT DOCUMENTS

0718631A2  6/1996  European Pat. Off. .

OTHER PUBLICATIONS

IBM Technical Disclosure Bulletin, vol. 20, No. 12, May 1978, XS 002032162, "Bistable Micromechanical Storage Element in Silicon," cited in an European Search Report.
A copy of an European Search reported dated May 25, 1998.

*Primary Examiner*—Jeffrey A. Gaffin
*Assistant Examiner*—Peter Ganjian
*Attorney, Agent, or Firm*—Tarolli, Sundheim, Covell, Tummino & Szabo

[57] ABSTRACT

An acceleration sensitive switch (10) equipped with an inertial mass member ("IMM") (12) that is deflectable from a holding position to an actuated position in response to a predetermined acceleration force. A voltage controlled hold plate (18) generates an electrostatic force that opposes the acceleration forces and holds the IMM (12) in a holding position until overcome by the predetermined acceleration force. The predetermined acceleration force necessary to trigger the switch may conveniently be adjusted by adjusting the voltage applied to the hold plate (18). The switch includes a self-test plate (34) that tests proper functioning of the switch. Other features include the interchangeability of the self-test plate and the hold plate. The switch is particularly useful as a safing switch in a system for controlling an air bag or other vehicle occupant restraint system.

65 Claims, 6 Drawing Sheets

ACCELERATION SWITCH

BACKGROUND OF THE INVENTION

This invention relates to a switch for sensing acceleration and, more particularly, to a switch that is actuated by a predetermined acceleration level, where the predetermined level may be electrically adjusted.

Automotive occupant restraint systems have, in prior times, used a distributed array of inertia-operated mechanical switches to sense the onset of a collision and trigger the actuation of the restraint system (e.g., a seat belt retractor or an air bag). More recently, the distributed arrays of mechanical switches have been replaced by one or more electronic acceleration sensors working in cooperation with a microprocessor and sophisticated software. The sensors provide electronic signals proportional to vehicle acceleration. The microprocessor assesses the frequent and rapid changes in the vehicle's acceleration and determines from this whether a crash event is in progress that requires the actuation of the occupant restraint systems.

Systems using acceleration sensors typically still include one inertia-operated mechanical switch, usually referred to as a "safing switch", for providing a redundant level of detection of the crash event. The safing switch is designed and calibrated to close at a relatively early stage in a crash event. Closure of the safing switch is a necessary condition but not the sole determinant in controlling actuation of the occupant restraint, however. The occupant restraint is only actuated when the microprocessor determines that the severity of the crash is sufficient to warrant such actuation.

Safing switches presently in use employ an inertial mass which moves, upon vehicle deceleration, against the resilience of a spring. Electrical contacts associated with the switch are coupled to the mass in such a way that the contacts close when the mass moves a certain distance from its initial, or rest, position. Since the deceleration impulse representative of a significant crash varies from one vehicle type to another, the switch design often must be modified to some extent from one vehicle type to another such that the switch will, in each case, close at the appropriate time for that particular vehicle type. Normal manufacturing tolerances, however, still cause the switch actuation point to vary from switch to switch. Thus, each individual safing switch is calibrated during manufacture to "fine tune" the switch closure to the proper deceleration impulse point selected for that vehicle type.

Safing switches now in use are manufactured by processes generally similar to those used to assemble other small mechanical devices. Efforts have been made, however, to develop smaller switches which could be manufactured using techniques like those used to manufacture semiconductor components and/or micromachined silicon elements. Patents describing such micromachined switch devices include U.S. Pat. Nos. 5,177,331, 4,855,544, and 4,543,457.

U.S. Pat. No. 5,177,331 discloses an "impact sensor" formed of micromachined silicon. The "impact sensor" includes contacts that close when the sensor is subjected to an impact. The sensor further includes electrodes between which an electrostatic field appears, creating a force tending to urge the contacts to close. When the contacts are in their unactuated position, the force is too small to perturb the contacts into the closed position. When the contacts close due to an impact, however, the nearness of the electrodes substantially increases the magnitude of the electrostatic field and the resulting force. The increased electrostatic force latches the contacts in the closed position until the field is released.

SUMMARY OF THE INVENTION

It is a primary object of the present invention to provide an acceleration switch that will be actuated when subjected to a force greater than a predetermined magnitude, where the magnitude of the force required to actuate the switch can be electrically adjusted.

In accordance with the present invention, a switch is provided that is responsive to a predetermined acceleration force. The switch includes an inertial mass member ("IMM") movable from a hold condition to an operative condition, wherein the member is capable of being deflected out of its hold condition in response to a predetermined acceleration force. The switch also includes electrical contacts associated with the IMM for changing between "closed" and "open" states when said IMM moves from a hold condition to an operative condition. A hold electrode generates an electrostatic field urging the IMM into its hold position, and the magnitude of the field can be adjusted by adjusting the voltage applied to the hold electrode. The IMM remains in said hold condition when subjected to accelerating forces that are less than the predetermined acceleration force established by said electrostatic field and deflects to its operating condition in response to said predetermined acceleration force greater than said predetermined acceleration force.

BRIEF DESCRIPTION OF THE DRAWINGS

The foregoing and other objects and advantages of the present invention will be better understood from the following description, appended claims, and accompanying drawings wherein:

DESCRIPTION OF PREFERRED EMBODIMENTS

Figure 1:
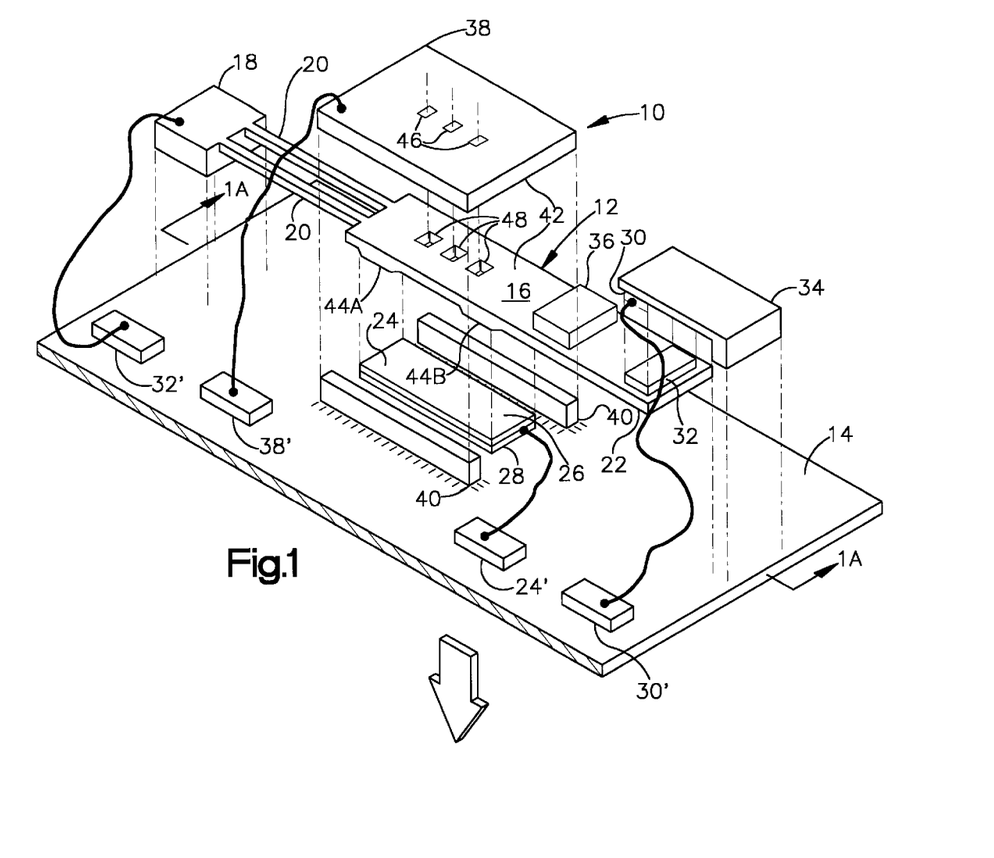
FIG. 1 is an exploded perspective view of one embodiment of a safing switch incorporating the teachings of the present invention.

FIG. 1 is an exploded perspective sketch of a preferred embodiment of the safing switch 10 made in accordance with the present invention, implemented in a fabricated microchip. The safing switch 10 includes a cantilever mounted inertial mass member (IMM) 12 which is formed of plated metal, such as nickel, fabricated on a substrate 14. The substrate 14 may be formed of a semiconductor material, such as oxidized silicon or gallium arsenide, or an insulator material such as glass or alumina.

Figure 1A:
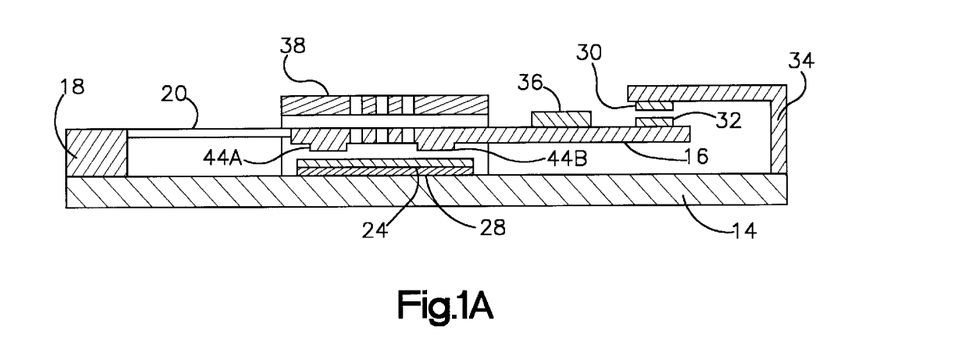
FIG. 1A is a side elevation sectional view of the embodiment of FIG. 1 taken along lines 1A—1A.

The IMM 12 includes a platform 16 that is attached to a base support 18 by a pair of cantilever arms 20. The base support 18 and the arms 20 as well as the platform 16 are made of electrically conductive metal. The base support 18 is affixed to the substrate 14 and has sufficient height so that the IMM is supported above the substrate 14 in a cantilever manner by the arms 20. The cantilever arms 20 impart spring-like properties to the IMM 12 so that it possesses a natural frequency of vibration. The cantilever arms 20 have a sufficient degree of stiffness, however, to support the platform in a suspended position above the substrate 14 in the absence of a force having a component acting in a direction normal to the substrate. An air space 22, best seen in FIG. 1A, therefore exists between the platform 16 of the IMM and the substrate 14.

The natural frequency of vibration of the IMM is related to the spring constant and length of the cantilever arms, and the mass of the IMM. The frequency can be conveniently adjusted in several ways, e.g. by adjusting the mass of the IMM through the addition to the platform of a mass 36 of suitable size, to move the natural frequency above or below the frequency range that might be encountered by the device in its system use. Once the device has been fabricated, however, the natural frequency of vibration of the cantilevered IMM is fixed.

The cantilever mounting of the IMM permits it to respond to the application of a force normal to the substrate by swinging up or down relative to the substrate 14. More specifically, when the substrate is accelerated in a direction normal to the substrate and downward (as viewed in FIG. 1) the arms 20 flex increasing the space between the platform 16 and the substrate 14 as the platform tries to stay at rest. The safing switch is equipped with a pair of electrical contacts that close when a certain amount of deflection of the platform 16 has occurred relative to the substrate. Within certain limits, the deflection of the IMM is related to the acceleration imparted to the substrate. Thus, the contacts close when the switch has been exposed to acceleration of more than a certain amount.

The contacts include upper and lower electrical contacts 30 and 32. The contacts will preferably comprise gold contact pads. The lower contact 32 is affixed to the top of the IMM 12 at the distal end of the platform 16. The upper contact 30 is affixed to the underside of a contact support structure 34. The contact support structure 34 is rigidly mounted on the substrate 14. The upper contact is aligned above the lower contact such that the two contacts meet upon sufficient upward deflection of the IMM 12. The lower contact 32 is electrically connected to the base support 18 through the platform 16 and arms 20 (it will be recalled that both platform 16 and arms 20 are formed of electrically conductive material).

The upper contact 30 and the base support 18 are electrically connected to respective contact pads 30' and 32' secured to the substrate 14. The electrical resistance between the two pads is normally very high (effectively infinite). When the device is accelerated downward (as viewed in FIG. 1) by more than a certain amount, however, flexing of the cantilever arms 20 causes the contacts 30 and 32 to meet, thereby creating a short circuit between pads 30' and 32'. Thus, in accordance with one embodiment of the present invention, the safing switch is normally "open", but "closes" when subjected to acceleration above a certain threshold.

The safing switch further includes a hold plate 24 for calibrating the acceleration level necessary to force the contacts 30 and 32 into physical and electrical contact. The hold plate comprises a conductor plate 28 secured to the substrate 14 and covered with an insulating material 26. The insulating material may, for example, be silicon dioxide, silicon nitride, aluminum oxide, or other insulator or combination of insulators. The conductive plate 28 is disposed beneath platform 16 and is spaced from the platform by a small air gap.

The conductive plate 28 is electrically connected to a contact pad 24'. Since the entire platform 16 is formed of a conductive metal and is connected to the contact pad 32', the application of a voltage across contact pads 24' and 32' will cause an electrostatic field to be established between platform 16 and hold plate 24. The electrostatic field will create an attractive force between the platform and the hold plate. The applied voltage is great enough that the resultant attractive force will draw the platform and hold plate together against the resilience of the cantilever arms 20. As the platform and plate approach one another, the separation between the two will diminish, resulting in an increase in the electrostatic field and a corresponding increase in the electrostatic force. Assuming a voltage of sufficient magnitude is applied across the pads, the platform will continue to move downward toward the hold plate until feet 44A and 44B on the underside of the platform 16 come into contact with the insulating layer 26. (The purpose of feet 44A and 44B will be described hereafter with reference to FIG. 5.) The platform will remain in this hold position abutting insulating layer 26 until either the electrostatic field is released, or the platform is forced away from the hold plate by a force of sufficient magnitude and duration to overcome the electrostatic attraction. Such a force may arise from acceleration caused, e.g., by an acceleration of the device in a downward direction as viewed in FIG. 1.

The acceleration necessary to trigger the safing switch can be adjusted by adjusting the voltage applied between pads 24' and 32' (the "holding voltage"). If the holding voltage is increased, then greater acceleration will be required to overcome the electrostatic attraction and more of an acceleration will be required to trigger the switch. If the holding voltage is reduced, then less acceleration will required to overcome the electrostatic attraction and correspondingly less acceleration will be required to trigger the switch. Thus, the trigger point of the switch can be electrically adjusted following manufacture of the switch.

Another method of adjusting the sensitivity of the switch relates to the size of the hold plates. The electrostatic force restraining the switch against actuation will vary directly as a function of the surface area of the hold plates to which the holding voltage is applied. Thus, the sensitivity of the switch may be adjusted by adjusting the surface area of the hold plate. One method of doing this is to modify the FIG. 1 design to include multiple hold plates, each electrically isolated from the others. The sensitivity of the safing switch may then be adjusted by selecting a particular plate or group of plates to which the holding voltage is to be applied. This may be done at the time of manufacture by wire bonding a selected one of, or a selected group of, the hold plates to the pad 24'. Alternatively, each hold plate may be electrically connected to a separate pad, with external circuitry applying a holding voltage only to selected ones of the pads.

The trigger point of the switch will also depend upon the spacing between the electrical contacts 30 and 32. The further the initial spacing, the greater the acceleration needed to overcome the resilience of the arms 20. Therefore, the threshold can be adjusted by adjusting the contact spacing. Switch closure will only occur when the acceleration to which the switch is subjected exceeds a threshold for a period of time adequate for the contact 32 to move across the gap and touch contact 30. Increasing the distance will also increase the time needed to move across the gap and, thereby, adjust the timing point at which switch closure occurs. In most applications, including most automotive crash sensing applications, the spacing of the IMM from the hold plate will be small so that needed flexure of the IMM is minimized.

Alternatively, the hold plate may be spaced from the IMM by a sufficient distance that the IMM flexes a substantial amount in being pulled back to its hold position. A significant spring force will then exist, tending to pull the IMM away from the hold position and toward the contact closed position. Thus, the switch will snap from an "off" position (platform resting against insulating layer 26) to an "on" position (contacts 30 and 32 in electrical and physical contact) rather abruptly when the acceleration to which the switch is subjected exceeds a certain threshold. The snap action will be enhanced because the electrostatic restraining force between the platform and hold plate will rapidly diminish as the IMM pulls away from the hold plate upon being dislodged by an acceleration. The reduction in electrostatic restraining force acts as positive feedback, tending to cooperate with the IMM spring force in urging the contacts toward closure. As stated above, this mode of operation will not be preferred for most applications.

In the safing switch device illustrated in FIG. 1, an additional self-test plate is provided for self-test purposes. The self-test plate will be formed of a conductive material, such as nickel. The self-test plate 38 is supported on a pair of supports 40 running longitudinally on either side of, and spaced transversely from, the IMM. The supports have sufficient height that self-test plate 38 extends above the platform 16 and is spaced from the platform by an air space 42, best seen in FIG. 1A. Self-test plate 38 is connected to a contact pad 38', whereby an electrostatic field may be established across the gap between the self-test plate 38 and the platform 16 by applying a voltage across contact pads 32' and 38'. Any such electrostatic field will create a corresponding electrostatic force that will tend to pull the platform 16 towards the self-test plate 38, effectively simulating a force caused by a downward acceleration of the switch.

The application of a voltage of sufficient magnitude (a "test signal") will cause the platform 16 to be pulled away from the hold plate and the switch to close. Thus, proper functioning of the switch can be verified through application of a test signal across pads 32' and 38'.

The self-test plate 38 may also be used to latch closed the contacts 30 and 32. To accomplish this, an external latch control circuit (not shown in FIG. 1) will monitor the contacts 30 and 32. When the contacts close, the circuit will immediately apply a test signal to the plate 38. The resulting electrostatic force will pull the IMM upward, thereby preventing the contacts from breaking. The contacts will remain closed until the test signal is removed. With such an arrangement, the contacts will initially close in response to acceleration above a threshold, but will latch in the closed position and remain closed until released by the external latch control circuit. Such an arrangement may be useful in certain vehicle occupant restraint systems, where it is desirable to extend the period of time that the safing switch contacts are closed to prevent the current arcing that might arise if the contacts were opened too early and insure that current flow continues long enough to ignite a squib.

A series of holes 46 and 48 are formed in the self-test plate 38 and the platform 16, respectively. The holes 46 and 48 are in alignment and permit the movement of air through the holes. The holes serve to control damping and the time response of the IMM 12 as it moves between the air spaces 22 and 42 in response to an acceleration of switch 10.

The entire device 10 will be mounted inside a housing (not shown). The housing will preferably be filled with an inert gas such as nitrogen. The contact pads 24', 30', 32', and 38' will be connected to exterior electrical pins or contacts of the device, and thus will be accessible to connection with other electrical devices.

The structure can easily accommodate multiple pole switch arrangements. For example, a second or third set of electrical contacts may be affixed to second or third electrically isolated supports and connected to additional pads on the substrate. Such multi-poled switches can be employed to operate other independent circuits or devices in response to acceleration forces.

Figure 2:
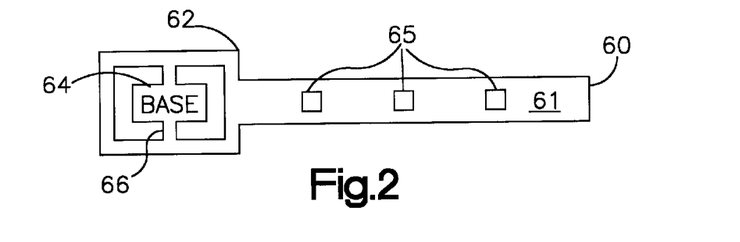
FIG. 2 is a simplified top view of another form of IMM useful in the device of FIG. 1.

FIG. 2 is a simplified plan view of an IMM of somewhat different design, wherein the IMM is resiliently supported by torsion bars 66 rather than the cantilever arms 20 shown in FIG. 1. The IMM 60 of FIG. 2 is generally similar in construction to the IMM 12 of FIG. 1, and includes a platform 61 carrying through-holes 65. Suitable contacts and additional masses, neither of which are shown in FIG. 2, are also provided on the platform 61 as necessary. The platform is integral with a generally rectangular frame 62 having a generally rectangular central opening. A base 64 is centrally disposed within the rectangular opening of the frame 62. The base 64 is connected to the inner perimeter of the frame by two torsion bars 66 projecting transversely from either side of the base 64. The base is joined to the substrate to thereby mount the IMM in the correct alignment relative to the other components of the switch. The other components may be as shown in FIG. 1. The torsion mounting arrangement of FIG. 2 permits the IMM 60 to swing towards or away from the substrate, in a direction substantially normal to the plane of the IMM.

The IMM may also be supported by other means that can be fabricated using micro machining techniques. The IMM may be supported by any type of micromachined hinge, provided that the hold voltage creates an electrostatic force sufficiently large to pull the IMM into the hold position from its initial, rest position. A micromachined hinge type support would have an advantage of not having a natural frequency of vibration. Such a hinge arrangement is described below with regard to FIGS. 14A and 14B.

Figure 3:
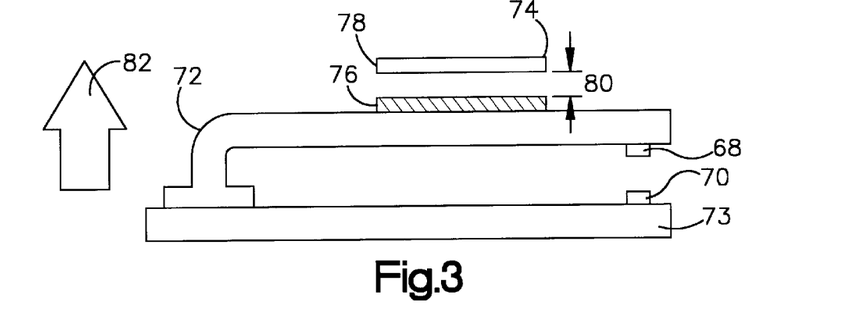
FIG. 3 is a simplified side view of a safing switch, showing an alternative arrangement wherein the electrical contacts are below the IMM.
Figure 4:
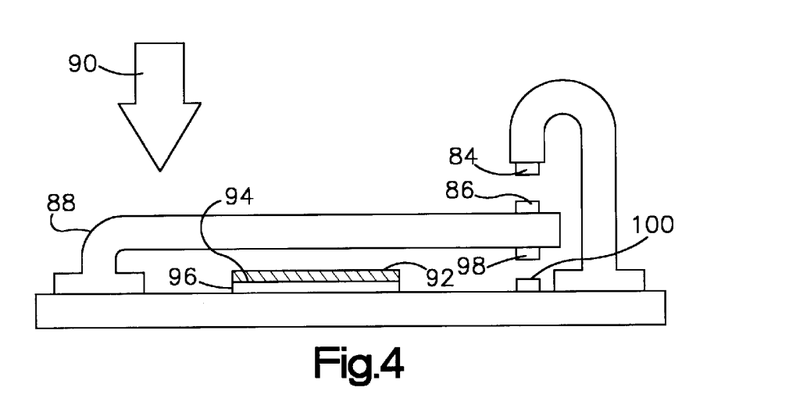
FIG. 4 is a simplified side view of a safing switch, showing another embodiment in which dual pairs of aligned contacts are employed.

FIGS. 3 and 4 show contact arrangements and hold plate locations that are alternatives to those associated with the preferred structure of FIG. 1. In FIG. 3, a pair of aligned upper and lower contacts 68 and 70 are disposed on the underside of the IMM 72 and on the top of the substrate 73, respectively. The hold plate 78 is suspended above the IMM by a support (not shown) similar to supports 40 of FIG. 1. The insulating layer 76 is deposited on the upper surface of the IMM rather than on the hold plate. The hold plate is spaced from the IMM and its associated insulating layer by an air space 80. The direction of the acceleration to be sensed is indicated by the arrow 82. Acceleration of the substrate in the direction indicated by arrow 82 will force the IMM downward (as viewed in FIG. 3), thus tending to bring the contacts 68 and 70 to closure. From a functional standpoint, the sensing devices of FIGS. 1 and 3 are similar.

FIG. 4 shows a safing switch similar to that of FIG. 3, with the exception that two pairs of aligned electrical contacts are provided, one pair above and one pair below the IMM. The lower contacts are included to permit verification that the IMM is in the correct holding position under the influence of the holding plate. Contacts 98 and 100 provide the desired verification by closing when the IMM is in the correct holding position.

A first pair of normally open electrical contacts 84 and 86 is positioned on top of the IMM 88. The direction of the acceleration tending to cause the deflection of the IMM 88 from the holding position is indicated by the arrow 90. The electrostatic force opposing the acceleration 90 is generated by a hold plate 92 made up of a metal plate 96 on which an insulator layer 94 has been deposited. Absent the predetermined acceleration 90, the hold plate normally pulls the IMM down, closing the contacts 98 and 100 and thereby confirming that the hold plate 92 is functioning and is retaining the IMM in the correct holding position. Of course, the safing switch in FIG. 4 may also be produced without contacts 84 and 86 and the associated contact support if it is desired to produce a simple "normally closed" switch.

Figure 5:
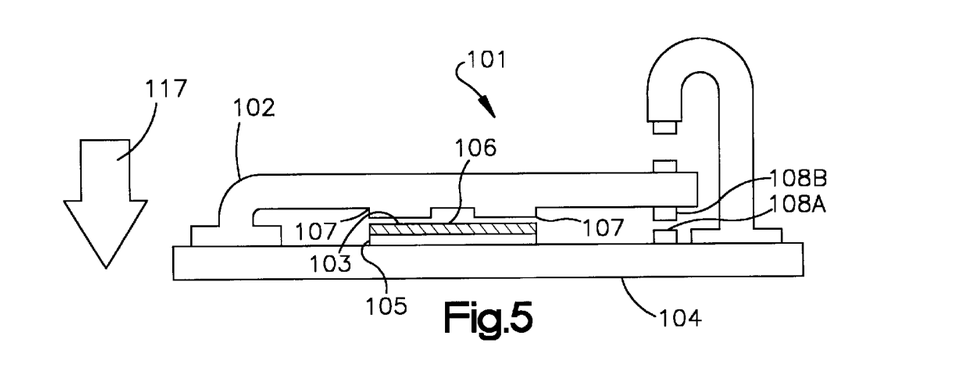
FIG. 5 is a simplified side view of another safing switch, showing the use of a stop that limit movement between the IMM and the hold plate.

The safing switch 101 of FIG. 5 has much the same construction as the switch 10 in FIG. 1. An IMM 102 is mounted on the substrate 104 along with a hold plate 103. The hold plate 103 comprises a metal plate 105 upon which has been deposited an insulation layer 106. As in the FIG. 1 embodiment, the IMM 102 is formed with integral depending feet 107 which cause most of the IMM 102 (i.e., all of the IMM except the feet) to stand off from the hold plate 103 when the IMM 102 is being held in the hold position by the hold plate 103. The stand off distance is equal to the height of the feet. This stand off distance is useful in reducing the strength of the electrostatic force holding the IMM 102 to the hold plate 103, in reducing the amount by which the IMM must flex to reach the hold position, and in providing open space across most of the IMM between the hold plate and the IMM. The open space is beneficial during the manufacture of the switch.

If the feet 107 were not included, (and assuming that a hold voltage of adequate magnitude to pull the IMM against the insulating layer 106 were applied to the hold plate 103) the entire IMM 102 would be held against the hold plate, spaced from the hold plate by only the thickness of the insulating layer. Because of the relatively large surface area of the IMM 102, the electrostatic force holding the IMM 102 to the hold plate 103 at this close spacing would be too large. The force or attraction could be reduced by reducing the voltage applied to the hold plate or by reducing the surface area of the hold plate. However, the voltage applied to the hold plate 103 cannot be made too small (nor can the hold plate be made too small) or the hold plate will be unable to "pull-in" the IMM from the larger spacing that exists when the IMM is in its undeflected position. By including feet 107, a hold voltage of suitably great magnitude may be employed without producing too great a holding force. The holding force will then primarily appear between the feet 107 and the hold plate 103, since the feet are then much closer to the hold plate than the remainder of the IMM, and will be adequate to pull the IMM from its undeflected rest position into the holding position.

In addition to the feet 107, the substrate is equipped with stops 108A and 108B that are electrically isolated from the IMM and the contacts and plates. One of the stops 108A is formed on the substrate under the IMM, while the other stop 108B is formed (at the same time that feet 107 are formed) on the underside of the IMM in a position aligned above the stop 108A. The heights of the stops 108A and 108B are selected such that, as the IMM 102 is drawn toward the substrate, the opposing faces of the stops meet before the feet 107 come into contact with the hold plate 103. Thus, the stops prevent the IMM 102 from making contact with the insulating layer of the hold plate 106. Since the stops prevent contact between the feet and the hold plate, the insulating layer 106 is redundant and may in some applications be omitted. In those applications in which the insulating layer is retained, however, the stops will advantageously eliminate the wear that might otherwise be caused by repeated contact between the feet and the insulating layer.

Figure 6:
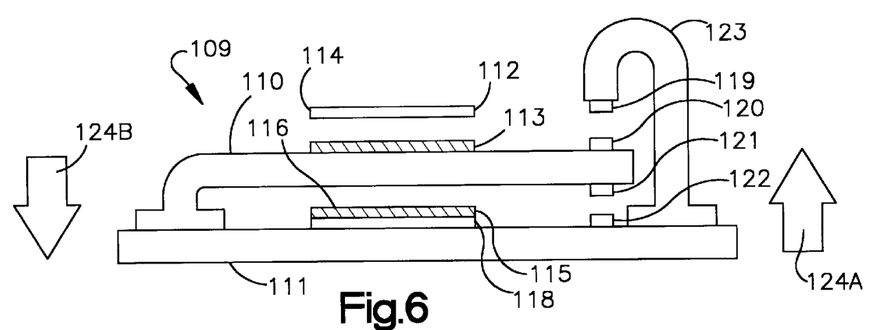
FIG. 6 is a simplified side view of a yet another safing switch, showing the interchangeability of the hold plate and the self-test plate.

The embodiment of FIG. 6 is designed so that it may be connected to sense accelerations directed either upwards (arrow 124A), or downwards (arrow 124B), as viewed in the Figure. This flexibility in the choice of the sense direction is provided by including functionally equivalent plates 112 and 115 above and below the IMM, respectively. Either of the two plates may be used as the hold plate, with the remaining plate then being used as a self-test plate. For example, if the switch is to be used to detect accelerations directed downwardly (in the direction indicated by arrow 124B in FIG. 6), then plate 115 may be used as the hold plate, with plate 112 being used as a self-test plate. As in prior embodiments, the lower plate 115 includes a planar metal plate 118 covered by an insulating layer 116. Also, as in prior embodiments, the upper plate 112 is formed of a planar metal plate 114 and is protected by an insulating layer 113 applied to the top of the IMM 110.

Two pairs of aligned upper and lower electrical contacts are provided to detect deflection of the cantilevered IMM. Contacts 119 and 120 are disposed above the IMM, and close when the IMM flexes upward by more than a preselected amount. More specifically, contact 119 is attached to a downward-facing surface of a support 123 and contact 120 is attached to the upper surface of the IMM 110, in aligned relationship below the upper contact 119. The closure of contacts 119 and 120 will then indicate that acceleration in the downward direction (indicated by arrow 124B) has exceeded the acceleration level for which the switch has been calibrated.

Contacts 121 and 122 are disposed below the IMM 110, and close when the IMM flexes downward by more than a preselected amount. More specifically, contact 121 is attached to underside of the IMM 110 and contact 122 is affixed to the substrate 111, in aligned relationship below contact 121. The closure of contacts 121 and 122 will then indicate that acceleration in the upward direction (indicated by arrow 124A) has exceeded the acceleration level for which the switch has been calibrated.

As with other embodiments, the spacing between the pairs of contacts is important in most applications since the acceleration required to trigger the switch (i.e., to close the contacts) is functionally related to the distance. More accurately, the acceleration required to dislodge the IMM from its holding position is generally dependent upon the voltage applied across the hold plate and IMM. The switch will only trigger (i.e., change switching states) if the acceleration is maintained for a certain (albeit rather brief) period of time related to the separation of the contacts. Thus, if the switch is to have equal sensitivity whether connected to sense upwardly or downwardly directed accelerations, the spacing between the pairs of contacts should be the same.

Similarly, it is desirable that the IMM, when in its undeflected location, be spaced by the same amount from plate 112 as from plate 115. When the plate/IMM spacings are equalized, the application of a given hold voltage to either plate will result in the establishment of an equivalent electrostatic holding force between that plate and the IMM. Thus, a similar or identical voltage source can be used to provide the holding voltage, regardless of the direction of sensitivity selected for the switch.

In the FIG. 6 embodiment, the contact pairs are mounted and spaced such that the contacts meet one another before the IMM makes contact with the associated plate. Thus, for example, the contacts 119 and 120 will close before insulating layer 113 on the IMM 110 comes into contact with the plate 114. The contact pairs thus act as stops and prevent actual physical contact between the IMM and either plate. For this reason, the insulating layers 113 and 116 are largely unnecessary and may, in some applications, be eliminated.

As with the other devices described herein, the switch 109 will be mounted on and housed in a suitable hollow carrier of the type used, for example, with integrated circuits. The carrier will in turn be mounted on a printed circuit board carrying other electronic components, and the printed circuit board will be mounted in an enclosure. The enclosure will be rigidly affixed to the body whose acceleration is to be sensed. The body may be the frame of a car or other vehicle, for example. If the circuit must be sensitive to acceleration in two opposing directions, then two of the switches 109 may be conveniently attached to same face of the printed circuit board, with one switch configured to detect acceleration in one direction and the second configured to detect acceleration in the opposite direction. Alternatively, only one of the switches 109 may be attached to the printed circuit board, but with additional circuitry provided on the circuit board to permit the direction of sensitivity to be switched from one direction to the opposite. As stated previously, this may be accomplished by selective application of a hold voltage to one of the plates 112 and 115 and monitoring of the appropriate one (diagonally opposite, as viewed in the figure) of the pairs of contacts.

Figure 7:
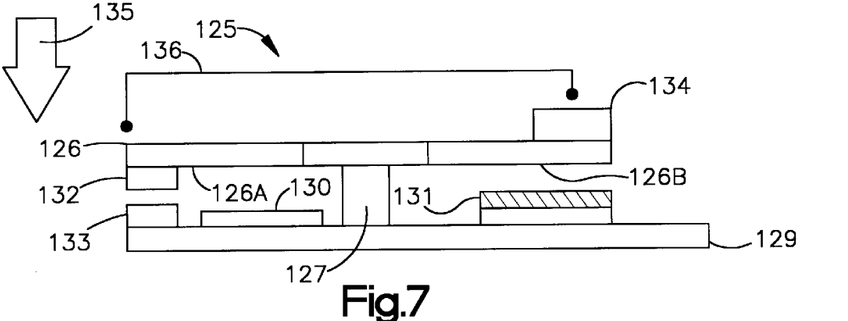
FIG. 7 is a simplified side view of a another safing switch, showing the use of a torsion bar and the formation of multiple lever arms on the same safing switch.

In the embodiment shown in FIG. 7 the safing switch 125 is equipped with an IMM 126 that is a variant of the IMM 60 shown in FIG. 2. The IMM includes a cantilevered arm 126A supported from a base 127 by a frame and torsion bar arrangement. The frame and the torsion bars, which are not readily visible in the FIG. 7 view, are similar to the frame and torsion bars shown in FIG. 2. In FIG. 7, however, the IMM includes a continuation arm 126B supported on the same frame, but from a point on the perimeter of the frame that is opposite from the point of attachment of the cantilevered arm 126A. The continuation arm is coplanar and collinear with cantilevered arm 126A. Moreover, the frame is relatively rigid and provides a relatively rigid attachment to each arm. Because of this, arms 126A and 126B may be considered to be two parts of a single relatively rigid arm supported near its midpoint by torsion bars extending transversely from the base 127. If either arm is forced to pivot in given direction about the torsion bars, the frame will transmit the motion to the other arm and will therefore produce a corresponding pivoting of the other arm.

Arm 126B counterbalances arm 126A, thus reducing the tendency of the arm 126A to pivot upon the application of an acceleration to the substrate. Indeed, if the moment of inertia of the two arms were identical, the IMM would be completely balanced and would have no tendency to pivot in response to applied acceleration. Since the pivoting response to acceleration is essential to the operation of the switch, the switch arms 126A and 126B must be unbalanced enough that the net action of any acceleration is to pivot the arms about the base. To unbalance the arms, one arm must have a greater moment of inertia than the other arm. In the embodiment illustrated in FIG. 7, this is accomplished by adding to the arm 126B an additional mass 134. With this additional mass, the moment of inertia of arm 126B will exceed that of arm 126A, hence the IMM will respond to a downward acceleration of the substrate (as viewed in FIG. 7) by pivoting in a counterclockwise direction about the torsion bars connecting the IMM to the base. Other methods of unbalancing the structure could be used. For example, one of the arms could be made longer than the other to give it a different effective moment arm length, or could be made wider than the other to increase its mass.

The embodiment of FIG. 7 includes self test and hold plates similar in purpose and function to the self test and hold plates described with respect to previous described embodiments. The self-test plate 130 is positioned below the arm 126A. The hold plate 131 is located beneath the arm 126B. A pair of aligned upper and lower normally open contacts 132 and 133, respectively, are affixed to the IMM arm 126A and the substrate 129, respectively. It may be desirable to equip this embodiment with suitable stops (indicated in a schematic sense at 136) to limit movement of the IMM 126.

Figure 8:
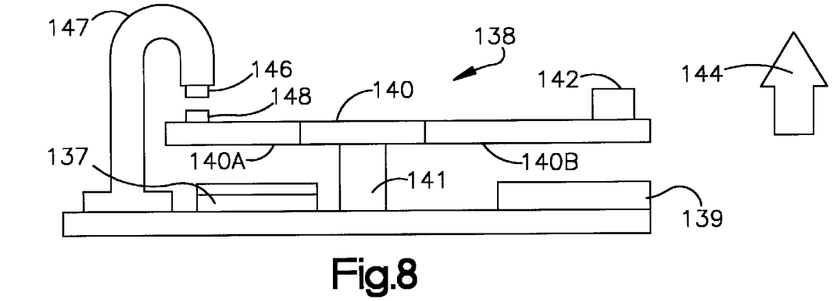
FIG. 8 is a simplified side view of a still another safing switch, showing another multiple arms arrangement.

FIG. 8 shows another embodiment 138 of a safing switch with an extended, centrally mounted IMM. The FIG. 8 embodiment is generally similar to FIG. 7 embodiment, except that the contacts are mounted above the IMM and the positions of the hold plate and self-test plate are reversed. The safing switch 138 has an IMM 140 mounted on a base 141 by torsion bars (not visible in FIG. 8) so that it can rock in both clockwise and counterclockwise directions. A pair of upper and lower electrical contacts 146 and 148, respectively, are mounted on top of the IMM 140. The lower contact is disposed on the upper surface of IMM 140, and the upper contact 146 is affixed to a support 147 which is, in turn, mounted on the substrate. The IMM 140 includes two arms 140A and 140B. Atop the arm 140B at the extreme right side of the arm (as viewed in FIG. 8), there is an additional mass 142. The safing switch 138 has a hold plate 137 located beneath the arm 140A and a self-test plate 139 located beneath the arm 140B. When the hold plate 137 is energized, the arm 140A is pulled back against the plate and thus the electrical contacts 146 and 148 are held open. The hold force will be overcome, and the contacts will close, when an acceleration of sufficient magnitude and duration is applied to the substrate in the direction indicated by the arrow 144. The acceleration level necessary to close the contacts 146 and 148 can be varied by increasing or decreasing the voltage applied to the hold plate 137.

The safing switches described herein may be fabricated using several rather different fabrication technologies. Conventional micro-machining processes can be used to construct switches as shown, for example. These processes involve the successive plating of metal and depositing of insulating layers on a substrate, with plated or deposited copper layers being used to fill those areas where voids will exist in the finished device. Features of the design that will ultimately be suspended above the voids are formed on top of the copper. At a later stage in the processing, the copper is etched away, leaving voids in the spaces previously occupied by the copper. Because other features of the design are formed of materials (e.g., nickel) that are not affected by the etching agents, those features remain following the etching operation. Thus, features previously formed on top of the copper (e.g., parts of the IMM) remain following the etching and find themselves suspended over the void. These techniques are well known and will not be described in detail herein.

Alternatively, the voltage controlled safing switch of this invention may be fabricated using other microelectronic processing techniques. The safing switch may be formed on a silicon substrate with conventional conductive, semiconductive and insulator materials rather than the plated metals described above in connection with the micro machining fabrication techniques. The alternative embodiments of FIGS. 9–12 illustrate devices based on silicon technology and constructed using standard microelectronic photolithographic techniques. The switch is built up in layers, using standard photolithographic processes which are old and well known, per se. The direction of the acceleration force which is to be sensed by the devices shown in FIGS. 9–12 is identified by the arrow 149.

Figure 9:
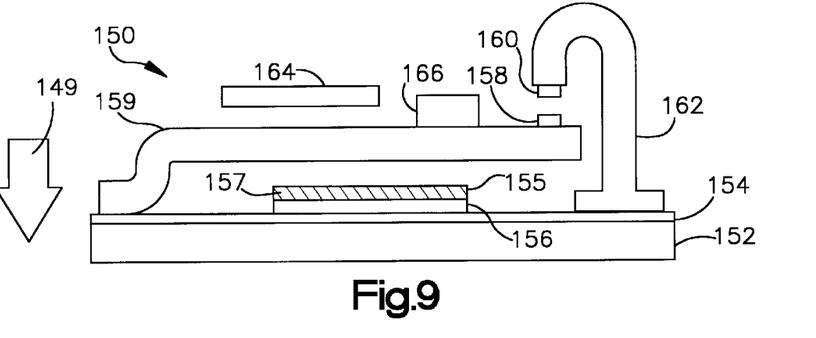
FIG. 9 is a simplified side view of a further safing switch, showing the hold plate and the IMM fabricated using doped polysilicon as the conductor for the hold plate and for the IMM.

In FIG. 9, the safing switch 150 is formed on a silicon substrate 152. An insulator layer 154, comprised of silicon nitride, covers the surface of the substrate. The switch is formed through a series of masked deposition and etching steps. In the resulting switch, the hold plate 156 and the IMM 159 are each formed of doped polysilicon and are electrically conductive. Insulator 157 is formed of silicon nitride.

A silicon dioxide layer is deposited on the surface of the substrate to provide a support layer upon which can be directly deposited the doped polysilicon for the IMM cantilevered arm. After the IMM is formed on the silicon dioxide layer, the silicon dioxide is etched away with buffered HF acid to form the void under the IMM. The self test plate 164, its supports (not shown) and contact support 162 are formed with plated nickel or other metal similar to the devices in FIGS. 1–8.

Figure 10:
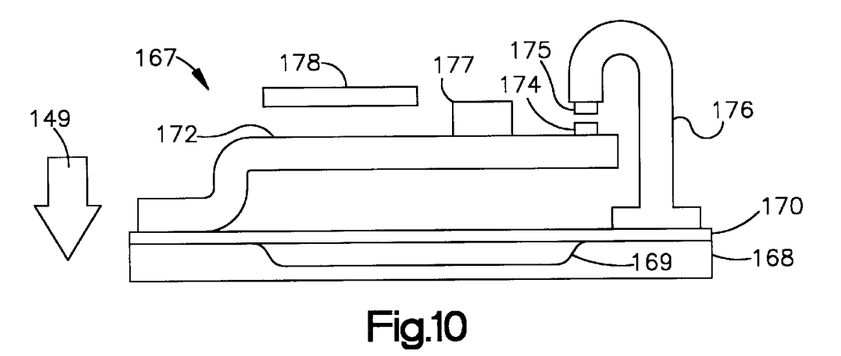
FIG. 10 is a simplified side view of a safing switch, showing a hold plate formed by diffusing into the substrate having an n+ or p+ diffusion.

FIG. 10 illustrates a safing switch 167 that is very similar to the device in FIG. 9. In FIG. 10, however, the hold plate is formed as part of the substrate by an n+ or p+ diffusion process. The substrate 168 is a doped p-type silicon, and the hold plate 169 is formed by masked diffusion into the substrate of an n+ dopant. If an n-type silicon substrate is used, then a p+ diffusion is required. The n+ or p+ diffusion region (as the case may be) serves as the hold plate 169. In this case, the silicon nitride layer 170 covering the substrate functions as the protective cover for the hold plate. An electrical contact (not shown) would be made to diffusion 169 to apply the hold voltage.

In free-standing structures, including those pictured in FIGS. 8 and 9, material stress tends to build up at bends and turns in the structure. Such structures are therefore somewhat more fragile and subject to fracture at those locations. To reduce the buildup of stress in the safing switches of the present invention, it is generally desirable to eliminate bends or turns in various parts of the switch. It therefore becomes desirable to produce a safing switch in which the IMM has no bends or steps. Such an embodiment of the invention is shown in FIG. 11.

Figure 11:
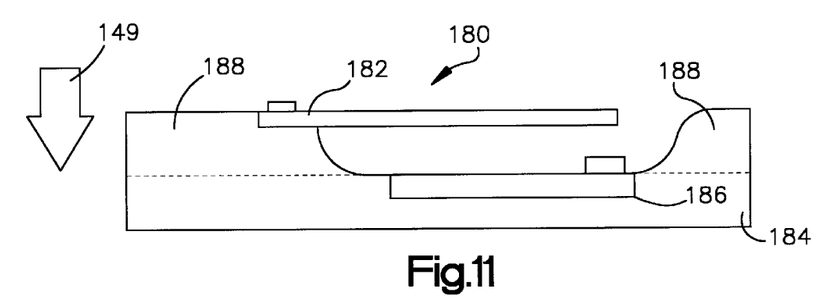
FIG. 11 is a simplified sketch showing a planarized IMM and the safing switch with a p+ silicon IMM and hold plate formed by a p+ diffusion into the substrate.

The embodiment of FIG. 11 includes a planarized or flat IMM 182. The IMM 182 in this embodiment is formed of p+ doped silicon. The hold plate 186 is formed by masked diffusion of a p+ dopant into the n- substrate 184. A n-type silicon layer 188 is then epitaxially grown over the substrate, and the p+ silicon IMM 182 is diffused into the epitaxial layer 188. The silicon layer 188 is then selectively etched away to form a cavity under the IMM 182 and thereby expose the hold plate 186. A planarized IMM 182, lacking any bends or turns is thus left cantilevered over the cavity and the hold plate. A self-test plate, additional mass, a pair of aligned electrical contacts, and contact to IMM 182 and diffusion 186 will also be provided to the FIG. 11 device. These elements have been omitted from FIG. 11 for simplicity of description. Their locations may be the same as those in FIGS. 9 and 10.

Figure 12:
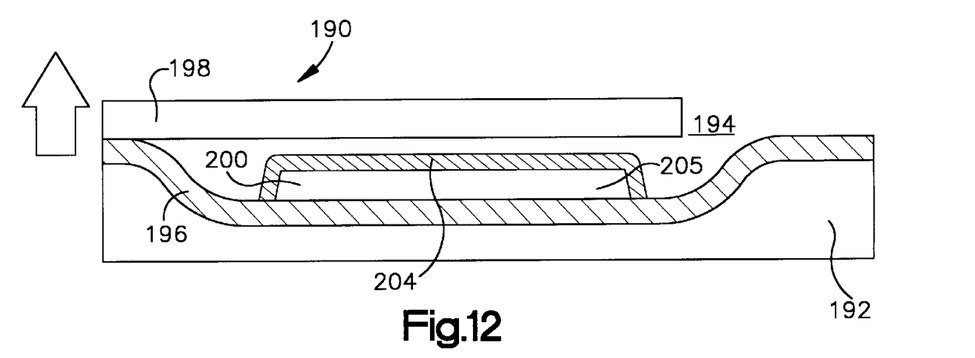
FIG. 12 is an illustrative sketch showing a planarized contour of the IMM formed of doped polysilicon and a hold plate beneath the IMM in a well formed of polysilicon as the conductor and silicon nitride as the insulator.

FIG. 12 shows another embodiment in which a planarized or flat IMM is formed of doped polysilicon. It is similar in construction to the safing switch of FIGS. 9 and 10, except that the IMM 198 is a flat, planar structure. The hold plate 205 is also made of polysilicon. The safing switch 190 is formed on a silicon substrate 192. A well or cavity 194 is formed to an appropriate depth within the substrate. An insulator layer 196 of silicon nitride is applied over the inside of the cavity 194. Another layer of doped polysilicon is deposited in the cavity on top of the silicon nitride layer to form the hold plate, and then a second layer 204 of silicon nitride is deposited over the polysilicon.

The IMM 198 is fabricated using a planarizing technique. Silicon dioxide is deposited into the cavity and then planarized by one of many possible techniques known to those skilled in the art of silicon processing. Doped polysilicon is deposited on top of the planarized silicon dioxide and then is patterned to form the IMM 198. The silicon dioxide layer is then selectively etched away. Through this process the doped polysilicon IMM 198 is left hanging over the cavity 194, which has been uncovered through the etching action. The hold plate 200 remains, having been protected against the etching agent by the layer of silicon nitride 204. As with FIG. 11, certain elements of the FIG. 12 device have been omitted from the drawing for convenience of description. The omitted elements include the self-test plate, the additional mass, the electrical contacts and the contacts support. The nature, location and orientation of these elements may be as described in the foregoing embodiments.

Figure 13:
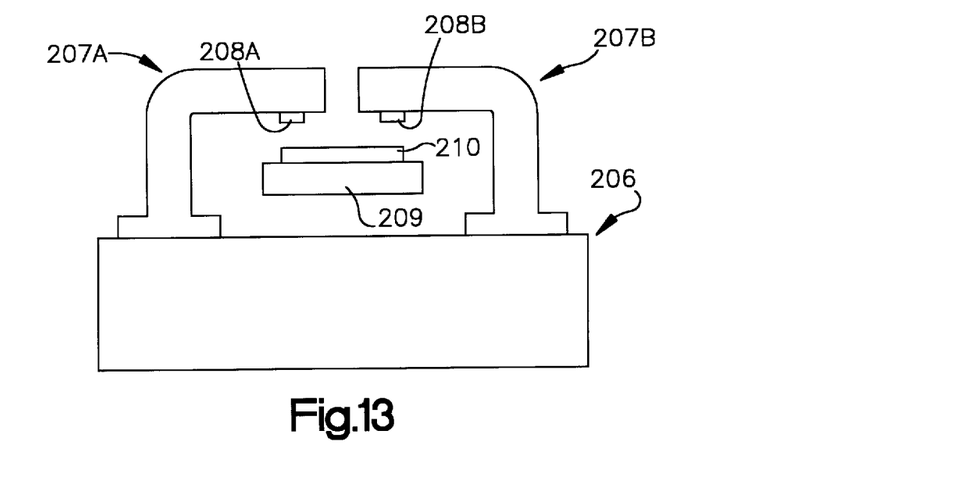
FIG. 13 is a simplified end view of a safing switch with an alternative switch contact layout.

FIG. 13 shows an end view of a portion of a safing switch with an alternative contact layout. This contact layout, which may be applied to any of the safing switch embodiments in FIGS. 1 through 12, consists of a long contact 210 above IMM 209. Contacts 208A and 208B are supported on the substrate 206, above contact 210, by their respective supports 207A and 207B. When the acceleration forces overcome the holding force on the IMM, contact 210 moves toward and touches contacts 208A and 208B. This contact configuration would be beneficial in safing switches requiring a lower contact resistance, or in safing switches using a material for the IMM that had a high resistivity.

The contact layout of FIG. 13 may readily be adapted to the embodiments shown in FIGS. 4, 6, and 7 by adding a contact similar to contact 210 on the underside of the IMM and adding contacts similar to contacts 208A and 208B directly on substrate 206.

Figure 14A:
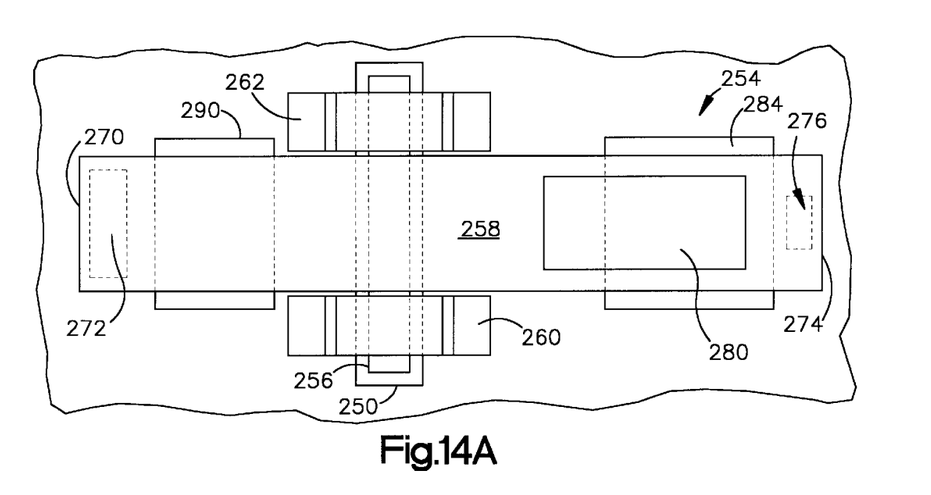
FIGS. 14A and 14B are simplified top and partial perspective view, respectively, of a still another safing switch, showing a "hinged" arrangement of the IMM.
Figure 14B:
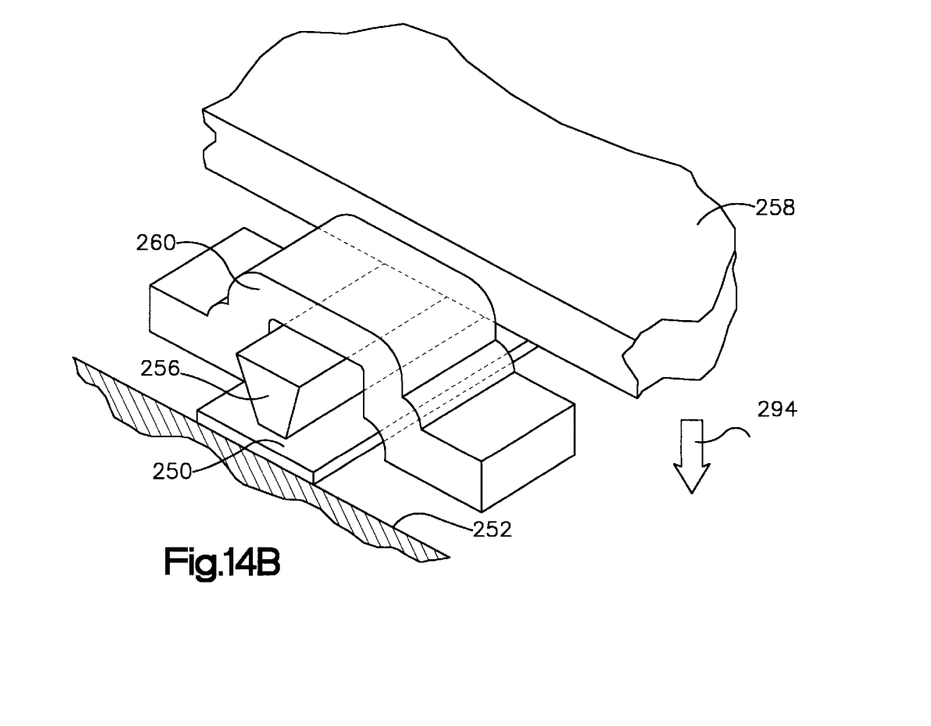

FIGS. 14A and 14B show another safing switch embodiment made in accordance with the present invention. An electrical pad 250 is mounted to the substrate 252. Switch 254 includes a pivot arm 256 secured to an IMM 258. The pivot arm 256 is pivotally held against the electrical pad 250 by upper support yokes 260, 262. The yokes 260, 262 and pivot arm 256 provide a hinge function for the IMM 258. Preferably, the IMM 258, pivot arm 256, and yokes, 260, 262 are also manufactured using a micro machine process or microelectronic processing technique.

Electrical contact with the IMM 258 is made through the electrical pad 250. Preferably, the electrical pad 250 is made from gold. Near one end 270 of the IMM 258, one electrical contact 272 of a contact pair is mounted to the substrate side of the IMM. The other electrical contact (not shown) of the contact pair is mounted to the substrate 252 in a manner similar to that described above. The other end 274 of the IMM 258 has a stop member 276 mounted to the substrate side of the IMM. A mass element 280 is secured to the top side of the IMM 258 to add an off-balance moment of inertia to the IMM as described above.

A hold plate 284 is secured to the substrate 252 and is positioned on the side of the IMM opposite the electrical contact 272. When a voltage is applied across the hold plate 284 and the IMM 258, the end 274 of the IMM is pulled downward toward the substrate 252 thereby opening the electrical contact pair at the other end 270. This arrangement biases the switch 254 to a normally open switch condition. When the switch 254 is subjected to an acceleration in the direction of the arrow 294 shown in FIG. 14B greater than a predetermined amount, the IMM will pivot about its hinge mount axis causing the contact pair to close. The amount of the acceleration necessary for switch closure is, again, controlled by the voltage level across the IMM 258 and the holding plate 284.

The switch 254 further includes a self-test plate 290 secured to the substrate 252 and position of the side of the IMM having the electrical contact 272. When it is desired to test the switch 254, a voltage is applied across the IMM 258 and the plate 290 so as to pull the end 270 downward relative to the substrate 252 and close the switch contact pair.

The switches of the present invention may be used in a variety of different systems in cooperation with a variety of different elements. As explained earlier herein, the switch will have particular utility when used as part of a system for controlling occupant restraint devices (e.g., air bags or seat belt retractors) in an automobile or other vehicle. In such a system, the switches of the present invention may be advantageously used as safing sensors. Safing sensors typically provide a redundant level of crash detection to assure that the occupant restraint device is deployed under predetermined circumstances and at a predetermined time.

Figure 15:
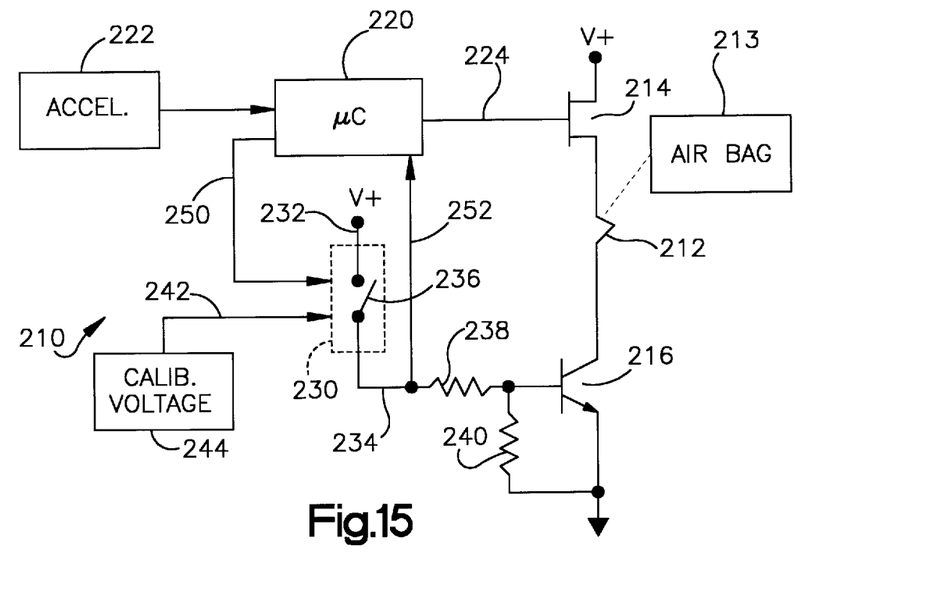
FIG. 15 is a block diagram of a control system for a vehicle occupant restraint system wherein the system uses a safing switch constructed in accordance with the present invention.

FIG. 15 is a block diagram of a controller 211 that uses a safing switch formed in accordance with the present invention. The FIG. 15 controller controls the supply of electrical current to a squib 212. The squib is mechanically and functionally associated with an occupant restraint device such as an air bag 213 or seat belt retractor (not shown). The squib includes a material that will ignite when current of a certain magnitude and duration is channeled through the squib. Ignition of the squib will cause deployment of the air bag, actuation of the seat belt retractor, or actuation of another actuatable restraining device.

The squib 212 is connected in series with two electronic switches 214 and 216 across a power source V+ (not shown, per se). As illustrated, the high side switch 214 is a field effect transistor ("FET") and the low side switch 216 is an "npn" bipolar junction transistor ("BJT"). When either of the two transistors is in its "off" or high impedance state, no current will pass through the squib 212. Thus, the squib 212 will only receive enough current to ignite if both transistor 214 and transistor 216 are in their "on" or low impedance states.

The transistor 214 is controlled by a microcomputer 220. An accelerometer 222 senses vehicle acceleration and provides to the microcomputer 220 an analog or digital signal having a value proportional to the magnitude of acceleration experienced from moment to moment by the vehicle on which the system is mounted. The microcomputer analyzes the acceleration using sophisticated software algorithms to determine whether the vehicle is experiencing a deployment crash condition. Such algorithms are known in the art and form no part of the present invention. When the microcomputer determines that the vehicle is experiencing deceleration of a size and character sufficient to warrant the deployment of the occupant restraint device, the microcomputer will provide a signal on output line 224 to switch transistor 214 from its "off" state to its "on" state.

The low side transistor 216 is controlled by a safing switch 230 constructed in accordance with the present invention. The safing switch provides an open or closed current path between a power line 232 and an output line 234 via two contacts represented in FIG. 15 as a single-pole single-throw switch 236. The output line 234 is connected to the base of transistor 216 through a current limiting resistor 238. The base of transistor 216 is also connected to ground through a pull-down resistor 240. When the switch 230 is open, the base of transistor 216 will be pulled to a ground voltage level by the pull-down resistor 240 and the transistor will thus be "off." When the switch 230 is closed, however, current will be supplied to the base of the transistor 216 from power line 232 via switch contacts 236 and current limiting resistor 238. Thus, when contacts 236 are closed, base current is supplied to transistor 216 and transistor 216 will turn "on". The contacts 236 will close when the switch 230 is exposed to acceleration along its direction of sensitivity which is greater than the threshold established by the voltage applied to the hold plate of the switch.

The hold plate of the switch 230 is connected to a calibration line 242. A calibration voltage source 244 supplies a predetermined calibration voltage on the calibration line 242. The calibration voltage sets the trigger threshold of the switch 230. The calibration voltage will be selected during a calibration step performed as part of the manufacturing process. During calibration, the calibration voltage is initially set to a high level. The switch 230 is then subjected (by means of a centrifuge or a "thumper", for example) to the acceleration to which the switch is to be calibrated. The calibration voltage is then lowered until the switch triggers. The calibration voltage at the triggering point is then the selected voltage. It is this voltage that is supplied to line 242 by the calibration voltage source 244.

It may in some cases be desirable to design voltage source 244 so that it provides a higher voltage at its output for a very brief time upon system power up, and then drops down to the selected calibration voltage once the switch has had sufficient time for its IMM to be drawn down to the hold plate.

Generally, the accelerometer 222 and the safing switch 230 will be oriented relative to the vehicle so that their sensitive axes are parallel to one another and are oriented in the direction in which acceleration is to be sensed. For example, if the system is to sense frontal collisions of a vehicle, the accelerometer 222 and switch 230 may conveniently be disposed so that the sensitive axis of each points toward the rear of the vehicle. The accelerometer and switch will have their associated axis of sensitivity oriented toward the rear of the vehicle because vehicle deceleration, is being sensed. This is referred to in the art as crash acceleration. Since the accelerometer and safing switch are aligned, they will be subjected to the same crash acceleration. When the crash acceleration rises above the threshold to which switch 230 has been calibrated, the contacts 236 will close and transistor 216 will turn "on". If the crash acceleration also manifests the characteristics to which the microcomputer 220 has been programmed to be sensitive, then the microcomputer 220 will cause the transistor 214 to also turn "on." With both transistors "on", current will flow through the squib 212, the squib will fire, and the associated occupant restraint systems will be actuated.

Each time power is applied to the control system 210, the microcomputer 220 will test the operation of the safing sensor 230. To perform the test, the microcomputer will supply a test voltage on an output line 250. The output line 250 is coupled to the self-test input of the switch 230, and is thus applied to the self-test plate of the safing switch. When the test voltage appears at the self-test input, the IMM of the safing switch will be forced to move and the switch contacts to close. The microcomputer will sense closure of the contacts, and thus proper operation of the switch, by monitoring the voltage on a line 252. Line 252 is connected to the output of the safing switch. Of course, before performing the test on the safing sensor, the microcomputer will effectively disable the transistor 214.

An acceleration sensitive switch has thus been described which can be fabricated using micro machining and semiconductor photolithographic techniques. The switch will be small and inexpensive. The switch will close if subject to acceleration over a threshold, but will otherwise remain open. The acceleration threshold of the switch may be easily and conveniently adjusted by adjusting a "hold" voltage applied to one terminal of the switch. Proper operation of the switch can be verified easily by applying a test signal to a test terminal of the switch. Many different embodiments of the switch have been described. The switch will have particular utility when used as a safing switch in a control system for a vehicle occupant restraint device.

Although the present invention has been described in considerable detail with reference to certain preferred versions thereof, it will be appreciated by those skilled in the art that various rearrangements or alterations of parts may be made without departing from the spirit and scope of the present invention, as defined in the appended claims.

What is claimed:

1. A switch adjustably responsive to an acceleration force, said switch comprising:
    an inertial mass member ("IMM") relatively movable from a hold position to an actuated position, said member relatively moving when said switch is accelerated and being deflectable out of its hold position in response to said switch acceleration of sufficient magnitude,
    electrical contacts, at least one of which is coupled to said IMM, for moving between closed and open positions when said IMM moves between said hold position and said actuated position,
    hold means comprising at least one hold electrode to which a hold voltage may be applied for adjustably establishing an electrostatic field creating a restraining force urging the IMM into its hold position, said field and said restraining force having a magnitude functionally related to said hold voltage, and
    means for applying a hold voltage to said hold electrode, and
    wherein said IMM remains in said hold position when said switch is subjected to acceleration forces that are insufficient to overcome forces tending to restrain said IMM to said hold position, including the restraining force established by said electrostatic field, and deflects to said actuated position when said switch is subjected to acceleration forces that are sufficient to overcome said forces tending to restrain said IMM,
    whereby the acceleration required to move relatively said IMM from said hold position to said actuated position may be adjusted by selecting the hold voltage applied to said hold means.

2. A switch as set forth in claim 1 further comprising means for adjusting said restraining force of said hold means by varying said hold voltage.

3. A switch as set forth in claim 1 further comprising a substrate adapted to be mounted on a member whose acceleration is to be sensed, wherein said IMM comprises a deflectable spring-like arm having a predetermined mass, and means for suspending said arm in cantilevered fashion above said substrate such that said arm extends generally parallel to said substrate.

4. A switch as set forth in claim 3 wherein said means for suspending comprises a base mounted on said substrate, said deflectable arm being rigidly joined to said base at the proximal end of said arm such that deflection of said IMM results in bending of said arm.

5. A switch as set forth in claim 3 wherein said means for suspending comprises a base mounted on said substrate, and means for flexibly joining said deflectable arm to said base at the proximal end of said arm such that deflection of said IMM results in flexing of said flexible joining means.

6. A switch as set forth in claim 5 wherein said flexible joining means comprises first and second torsion bars extending from said base at opposite sides thereof and in directions generally transverse to said deflectable arm, and means for joining said deflectable arm to the ends of said torsion bars, whereby deflection of said IMM results in torsional flexing of said torsion bars.

7. A switch as set forth in claim 6, said IMM further comprising an elongated continuation arm and means for joining said continuation arm to said deflectable arm and to said ends of said torsion bars such that said continuation arm extends from said base on the opposite side from said deflectable arm and deflects in unison with said deflectable arms.

8. A switch as set forth in claim 7 wherein said one of said electrical contacts is fixed to said continuation arm.

9. A switch as set forth in claim 3 wherein said hold electrode is disposed on said substrate, and is below said arm.

10. A switch as set forth in claim 9 wherein said arm has disposed thereon a second electrode generally in registration above said hold electrode, whereby said arm electrode and said hold electrode are generally parallel to one another and are closely spaced from one another.

11. A switch as set forth in claim 10 wherein said arm is formed of an electrically conductive material and said arm electrode is an integral part thereof.

12. A switch as set forth in claim 3 wherein said hold electrode is supported by said substrate and is disposed above said IMM.

13. A switch as set forth in claim 3 wherein said electrical contacts are positioned above said IMM relative to said substrate and are adapted to be normally open and to close when said IMM is deflected away from said substrate.

14. A switch as set forth in claim 3 wherein the electrical contacts are positioned below the IMM relative to the substrate and are adapted to be normally open and to close when said IMM is deflected toward said substrate.

15. A switch as set forth in claim 3 wherein said electrical contacts comprise first and second pairs of electrical contacts, with one contact of each said pair being coupled to said IMM for movement therewith and the other contact of said pair being coupled to said substrate.

16. A switch as set forth in claim 15 wherein one of said pairs of electrical contacts is positioned above said IMM relative to said substrate and is adapted to close when said IMM moves away from said substrate, and the other of said pairs of electrical contacts is positioned below said IMM relative to said substrate and is adapted to close when said IMM is moved toward said substrate.

17. A switch as set forth in claim 3 further comprising means for damping relative movement of said IMM.

18. A switch as set forth in claim 3 wherein said IMM moves through a fluid and has openings formed therein for controlling the flow of the fluid past said IMM as said IMM relatively moves in said fluid, whereby said openings control damping of relative movement of said IMM.

19. A switch as set forth in claim 3 wherein said IMM is electrically conductive and has at least one portion depending toward said hold electrode, whereby said electrostatic field interacts with said at least one depending portion of said IMM.

20. A switch as set forth in claim 19 wherein each of said at least one depending portions includes a generally planar surface that is closely adjacent to, and generally parallel to, said hold electrode.

21. A switch as set forth in claim 1 further comprising a substrate adapted to be mounted on a member whose acceleration is to be sensed, and hinge means for pivotally mounting said IMM to said substrate.

22. A switch as set forth in claim 1 wherein said hold electrode and said electrical contacts are disposed on opposite sides of said IMM.

23. A switch as set forth in claim 1 wherein said hold electrode and said the electrical contacts are disposed on the same side of said IMM.

24. A switch as set forth in claim 1 further including self test means for testing the operational integrity of said electrical contacts.

25. A switch as set forth in claim 24 wherein said self test means comprises a test electrode to which a voltage may be applied for urging said IMM towards its actuated position.

26. A switch as set forth in claim 25 wherein said test electrode and said hold electrode are disposed on opposite sides of said IMM.

27. A switch as set forth in claim 1 wherein said hold electrode comprises a generally planar, electrically conductive sheet covered with an electrically insulating layer.

28. A switch as set forth in claim 27 wherein said insulating layer is formed of silicon nitride.

29. A switch as set forth in claim 1 wherein said IMM comprises plated metal.

30. A switch as set forth in claim 29 wherein said plated metal is plated nickel.

31. A switch as set forth in claim 1 wherein said IMM is mounted on a substrate formed of glass or alumina.

32. A switch as set forth in claim 1 wherein said IMM is mounted on a substrate comprised of a semiconductor material.

33. A switch as set forth in claim 32 wherein said semiconductor is silicon or gallium arsenide.

34. A switch as set forth in claim 32 wherein said hold electrode is formed of doped polysilicon.

35. A switch as set forth in claim 34 wherein said hold electrode is formed by p+ diffusion into an n- silicon layer.

36. A switch as set forth in claim 34 wherein said hold electrode is formed by n+ diffusion into a p- silicon layer.

37. A switch as set forth in claim 1 wherein said hold means is disposed closely adjacent said IMM and wherein said switch further includes stop means for limiting the relative movement of said IMM into said hold position so as to thereby prevent said IMM from contacting said hold means.

38. A switch as set forth in claim 1 wherein said at least one hold electrode comprises at least two hold electrodes.

39. A switch as set forth in claim 38 further comprising means for adjusting said restraining force by controlling the application of said hold voltage to selected ones of said at least two hold electrodes.

40. A system for recognizing the onset of a crash of a vehicle and providing a control signal indicative thereof, comprising:

an accelerometer responsive to crash acceleration of said vehicle for providing a crash acceleration signal which varies as a continuous function of said crash acceleration;

microprocessor means responsive to the crash acceleration signal for determining from said signal whether said vehicle is experiencing a crash condition;

a safing switch responsive to crash acceleration of said vehicle, said safing switch comprising
an inertial mass member ("IMM") supported by a tensile force and relatively movable from a hold position to an actuated position in response to acceleration of said vehicle,
electrical contact means associated with said IMM for generating an electrical signal when said IMM is in its actuated position,
hold means responsive to a voltage for applying an electrostatic force to said IMM to bias said IMM into said hold position, and
means for applying a voltage to said hold means to thereby establish the magnitude of the bias on said IMM and thus the predetermined vehicle crash acceleration necessary to force said IMM from its hold position to its actuated position; and means responsive to said microprocessor means and to said electrical signal provided by said electrical contact means for providing said control signal in accordance therewith.

41. The system as set forth in claim 40 further comprising an occupant restraint device for restraining the movement of a vehicle occupant upon a crash of said vehicle, said occupant restraint device being responsive to said control signal for controlling the operation of said device.

42. The system as set forth in claim 41, wherein occupant restraint device is an air bag.

43. The system as set forth in claim 41 wherein said voltage is selected such that said IMM moves to said actuated position upon said safing switch experiencing acceleration of a magnitude indicating that said vehicle is experiencing a crash.

44. The system as set forth in claim 40 wherein said force applied by said hold means is an electrostatic attractive force having a magnitude functionally related to said applied voltage.

45. The system set forth in claim 40 wherein said safing switch further comprises self test means for determining the operational integrity of said electrical contacts.

46. The system set forth in claim 40 wherein hold means comprises a conductive substrate capable of generating an electrostatic attractive force, and an insulating layer covering and protecting said conductive substrate, said conductive substrate being positioned closely adjacent said IMM such that said electrostatic attractive force affects said IMM.

47. The system as set forth in claim 40 wherein said electrical contact means comprises a pair of electrical contacts, said contacts being "closed" when said IMM is in one of said hold and actuated positions, and "open" when said IMM is in the other of said hold and actuated positions.

48. The system as set forth in claim 40 wherein said IMM is plated metal.

49. The system as set forth in claim 40 wherein said IMM is mounted on a substrate comprised of a semiconductor material.

50. The system as set forth in claim 49 wherein said semiconductor is silicon or gallium arsenide.

51. A method of deploying occupant crash restraint apparatus in a vehicle as a function of the crash acceleration experienced by said vehicle comprising the steps of:

providing a control circuit for assessing changes in the acceleration experienced by said vehicle, said control circuit including a safing switch having an inertial mass member ("IMM") that relatively moves in response to a predetermined crash acceleration level to generate an electrical signal indicating a crash event;

applying an electrostatic force to said IMM to urge said IMM in the direction opposite the direction of acceleration movement of said safing switch, said applied electrostatic force being selected according to the predetermined level of acceleration to which said switch is to be responsive;

generating an electrical signal when said IMM moves in response to acceleration of said switch greater than said predetermined crash acceleration level; and actuating said occupant crash restraint apparatus when said electrical signal is being generated by said IMM.

52. In a crash detection apparatus capable of deploying an occupant air bag restraint, a safing switch responsive to a predetermined acceleration force and generating an electrical signal when said safing switch is actuated, said safing switch comprising:

an inertial mass member ("IMM") relatively movable from a hold position to an actuated position in response to each acceleration of said switch;

electrical contact means associated with the inertial mass member for generating an electrical signal when said IMM is in its actuated position; and hold means for generating an electrostatic attractive force urging the IMM into its hold position and restraining the IMM from relatively moving in response to a crash acceleration less than a predetermined crash acceleration value;

whereby said IMM is relatively moved to its actuated position in response to a crash acceleration which overcomes the restraining action of the electrostatic force, and, when said IMM is in its actuated position, the electrical contacts means generates the electrical signal so as to enable the deployment of said air bag.

53. The apparatus set forth in claim 52 further including self test means for testing the electrical continuity of the safing switch.

54. The apparatus as set forth in claim 53 wherein said self-test means and said hold means are interchangeable.

55. The apparatus as set forth in claim 53 wherein each of said self-test means and said hold means is an electrically conductive plate, and wherein said self-test plate and hold plate are disposed on opposite sides of said IMM but are generally equidistant from said IMM.

56. The apparatus as set forth in claim 55 wherein said self-test plate is adapted to latch said electrical contact means once said predetermined acceleration force is sensed thereby preventing interruption of the deployment of said air bag.

57. The apparatus as set forth in claim 52 wherein said hold force applied by said hold means is adjusted by said applied voltage.

58. The apparatus as set forth in claim 52 wherein said electrical contacts comprise dual pairs of aligned electrical contacts, and wherein one pair is disposed on one side of said IMM and the second pair is disposed on the opposite side of said IMM.

59. The apparatus as set forth in claim 58 wherein one of said pairs of electrical contacts confirms that said IMM is in its hold position and the other pair generates said electrical signal when said safing switch senses a predetermined acceleration force.

60. The apparatus as set forth in claim 58 wherein one of the pairs of electrical contacts is normally open.

61. The apparatus as set forth in claim 58 wherein one of the pairs of electrical contacts is normally closed.

62. An acceleration responsive switch comprising:

a base member;

a switch arm;

mounting means for mounting said switch arm to said base member so that acceleration of said base member results in relative movement between said switch arm and said base member;

a pair of electrical contacts, one of said electrical contacts mounted to said switch arm and a second of said electrical contacts mounted to said base member so that said acceleration of said base member changes the switching state of said pair of electrical contacts; and electrostatic bias means operatively coupled to between said base member and said switch arm for providing a bias force to resists relative movement between said switch arm and said base member.

63. The apparatus of claim 62 wherein said electrostatic bias means prevents said pair of electrical contacts from changing switching state until said base member is subjected to an acceleration greater than a predetermined amount.

64. The apparatus of claim 63 wherein said base member, said switch arm, said mounting means, and said electrostatic bias means are arranged so that said electrical contacts are normally open and said electrical contacts close when said base member is subjected to an acceleration greater than said predetermined amount.

65. A system for recognizing the onset of a crash of a vehicle and providing a control signal indicative thereof, comprising:

an accelerometer responsive to crash acceleration of said vehicle for providing a crash acceleration signal which varies as a continuous function of said crash acceleration;

microprocessor means responsive to the crash acceleration signal for determining from said signal whether said vehicle is experiencing a crash condition;

a safing switch responsive to crash acceleration of said vehicle, said safing switch comprising a base member;

a switch arm;

mounting means for mounting said switch arm to said base member so that acceleration of said base member results in relative movement between said switch arm and said base member;

a pair of electrical contacts, one of said electrical contacts mounted to said switch arm and a second of said electrical contacts mounted to said base member so that said acceleration of said base member changes the switching state of said pair of electrical contacts; and electrostatic bias means operatively coupled to between said based member and said switch arm for providing a bias force to resists relative movement between said switch arm and said base member; and means responsive to said microprocessor means and to said change of the switching state of said pair of electrical contacts for providing said control signal in response thereto.

* * * * *